US 7,509,248 B2

(12) United States Patent
Fernandez (10) Patent No.: US 7,509,248 B2
(45) Date of Patent: Mar. 24, 2009

(54) GENERIC PERSISTENCE ENGINE

(75) Inventor: Jose Fernandez, Morganville, NJ (US)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 10/004,196

(22) Filed: Nov. 14, 2001

(65) Prior Publication Data

US 2003/0093770 A1    May 15, 2003

(51) Int. Cl.
*G06F 9/455*    (2006.01)
(52) U.S. Cl. .................................... 703/27; 707/200
(58) Field of Classification Search .................. 703/27; 707/200
See application file for complete search history.

(56) References Cited

U.S. PATENT DOCUMENTS

| | | | | |
|---|---|---|---|---|
| 5,760,716 A | * | 6/1998 | Mathews et al. | 341/50 |
| 5,970,490 A | * | 10/1999 | Morgenstern | 707/10 |
| 6,167,405 A | * | 12/2000 | Rosensteel et al. | 707/102 |
| 6,418,451 B1 | * | 7/2002 | Maimone | 707/200 |
| 6,654,734 B1 | * | 11/2003 | Mani et al. | 707/2 |
| 6,748,388 B1 | * | 6/2004 | Kasamsetty et al. | 707/10 |
| 6,999,956 B2 | * | 2/2006 | Mullins | 707/2 |
| 2002/0073236 A1 | * | 6/2002 | Helgeson et al. | 709/246 |
| 2002/0103829 A1 | * | 8/2002 | Manning et al. | 707/513 |
| 2002/0123993 A1 | * | 9/2002 | Chau et al. | 707/5 |
| 2002/0129059 A1 | * | 9/2002 | Eck | 707/513 |
| 2002/0169788 A1 | * | 11/2002 | Lee et al. | 707/104.1 |
| 2003/0037037 A1 | * | 2/2003 | Adams et al. | 707/1 |

OTHER PUBLICATIONS

"Extensible Markup Language (XML) 1.0"; W3C Recommendation Feb. 10, 1998, 1998.*
web page for DeltaXML.com from Sep. 2001 using www.archive.org at web.archive.org/web/20011021144026/www.deltaxml.com/prod-xmlschema-1000.html.*
Ives, Zachary G.; Florescu, Daniela; Friedman, Marc; Levy, Alon; Weld, Daniel S.; "An Adaptive Query Execution System for Data Integration", 1999, SIGMOD 1999.*
Kanne, Carl-Christian; Moerkotte, Guido; "Efficient storage of XML data", 1999, Technical Report Aug. 1999, University of Mannheim.*
Schoning, Harald; "Tamino—a DBMS Designed for XML", 2001 Proceedings 17th International Conference on Data Engineering, Apr. 2-6, 2001.*
Deutsch, Alin; Fernandez, Mary; Suciu, Dan; "Storing Semistructured Data with STORED", 1999, Proceedings of the 1999 ACM SIGMOD international conference on management of data.*
Nestorov, Svetlozar; Abiteboul, Serge; Motwani, Rajeev; "Extracting Schema from Semistructured Data", 1998, Proceedings of the 1998 ACM SIGMOD international conference on Management of data.*

(Continued)

*Primary Examiner*—Paul L Rodriguez
*Assistant Examiner*—Russ Guill
(74) *Attorney, Agent, or Firm*—Blakely, Sokoloff, Taylor & Zafman LLP (57) ABSTRACT

A method and apparatus for receiving persistent data into a running system. Metadata comprising a description of the known and/or unknown data model structure of the persistent data is used to establish a storage format and location for the persistent data, during runtime of the system. New transforms are created for data structures unknown to a running system.

48 Claims, 11 Drawing Sheets

OTHER PUBLICATIONS

Philip A. Bernstein et al.; "Generic Schema Matching with Cupid", Sep. 2001, Proceedings of the 27th International Conference on Very Large Databases.*

Philip A. Bernstein et al.; "A Survey of Approaches to Automatic Schema Matching", Dec. 2001, The VLDB Journal—The International Journal on Very Large Databases, vol. 10, Issue 4.*

Philip A. Bernstein et al.; "A Vision for Management of Complex Models", Dec. 2000, SIGMOD Record, vol. 29, No. 4.*

AnHai Doan et al.; "Reconciling Schemas of Disparate Data Sources: A Machine-Learning Approach", May 2001, Proceedings of the 2001 ACM SIGMOD International Conference on Management of Data, vol. 30, Issue 2.*

Tova Milo et al.; "Using Schema Matching to Simplify Heterogeneous Data Translation", 1998, , Proceedings of the 24th Very Large Database Conference.*

Barbara Staudt Lerner et al.; "Beyond Schema Evolution to Database Reorganization", 1990, Proceedings of the European conference on object-oriented programming on Object-oriented programming systems, languages, and applications OOPSLA/ECOOP '90, vol. 25, issue 10, pp. 67-76.*

L.M. Haas et al.; "Transforming Heterogeneous Data with Database Middleware: Beyond Integration", 1997, Bulletin of the IEEE Computer Society Technical Committee on Data Engineering, pp. 1-6.*

Elke A. Rundensteiner et al; "Maintaining Data Warehouse over changing information sources", Jun. 2000, Communications of the ACM, vol. 43, No. 6, pp. 57-62.*

Sams, "Sams Teach Yourself PL/SQLTM in 21 Days", second edition, 2000, Sams Publishing, pp. 224-227.*

"Database Language SQL—Part 2: Foundation (SQL/Foundation)", Sep. 1999, ISO/IEC 9075-2:1999, p. 34.*

* cited by examiner

GENERIC PERSISTENCE ENGINE

TECHNICAL FIELD

The present invention relates generally to the field of data storage, and more specifically to persistence engines for storing collections of networked information.

BACKGROUND

Persistence is a property related to programming languages by which created objects continue to exist and variables continue to retain their values between runs of a program. Persistence allows data to have lifetimes that vary from transient to indefinite. Thus, persistence is particularly important in internet-programming languages, object-oriented databases, and data warehousing. Persistent programming languages offer an alternative to applications that require more than traditional database support.

Persistence in a programming language, the Java language for example, allows all kinds of objects to have the same available lifetimes. An orthogonally persistent variant of the Java platform, Persistent Java (PJava), simplifies the task of developers if a Java application involves objects constructed at runtime, and those objects are needed during more than one invocation of the application. But orthogonal persistence in PJava does not address all applications, such as applications for which a relational data model and structured query language are important.

Further developments have attempted to broaden the types of data and objects that may be given persistence. Within the Java environment, extensions have been added to PJava to provide limited transparent access to legacy data such as files and relational data systems. Java data base manager (JDBM) is a transactional persistence engine for Java. JDBM can store a mix of objects, and updates are done in a transactionally safe manner. JDBM also provides scalable data structures to support persistence of large object collections.

Java "Reflection" is a mechanism that allows Java to map "runtime type information" of objects during program execution. A class library deciphers the properties and methods of unknown objects during runtime. The Reflection mechanism, however, is limited to the Java environment.

The need to impart persistence to diverse types of objects has resulted in information organization structures, or "metadata." Meta Content Framework (MCF) is a structure description language. An MCF database is a set of directed labeled graphs (DLGs) including a set of labels (property types), a set of nodes, and a set of arcs (properties). Nodes can represent items such as web pages, images, subject categories, sites, people, places, and events. DLGs seek to attach properties to nodes and property types thereby allowing MCF to be its own data schema definition language.

The Object Management Group's Meta Object Facility (MOF) is a specification for describing and defining metadata. The Common Warehouse Metamodel (CWM) provides a common meta-model with syntax and semantics for dynamic data warehousing operations. Both MOF and CWM focus on compile-time models of data and metadata from which interfaces and code are derived. Changes to compile-time models of data and metadata require restarting the host system.

Microsoft Repository has a relational database for storing object properties and relationships. The engine manages the database and provides basic functions of data storage and retrieval. The technology may be used for defining compile-time, but not runtime, data models for software development.

Traditionally, a software component's persistent data model must be known at system compilation time. Those elements of the model (e.g., entities, relationships, attributes, and values) must be well defined so that the appropriate data access and storage schemes can be developed for each software component prior to system runtime. Any changes to a component's data model, as well as introduction of new components into the system, typically require placing the system into an inactive state while the new data models are incorporated. This incorporation may include recompilation of existing system components or introduction of new system components involved in the system's overall data management scheme. This results in a maintenance cycle with undesirable human intervention. The system must be taken out of service, necessary coding and testing must be performed, and the system has to be restarted.

Specifically, when an object is first made persistent in a store, the class of the object including the bytecodes is also made persistent and the object bound to the persistent instance of the class. When changes are made to source code in the file system, and the code is recompiled generating a new class file, the changes have no effect on the behavior of the objects in the persistent store. Modifying the class in the persistent store requires the additional step of inactivating the system, and repairing the class in the persistent store, or deleting the persistent store and recreating it from scratch. In a high availability environment, this is usually unacceptable. What is needed is seamless integration of new persistent data models without compromising the availability of the running system.

BRIEF DESCRIPTION OF THE DRAWINGS

The invention is illustrated by way of example, and not by way of limitation, in the figures of the accompanying drawings in which like reference numerals refer to similar elements and in which.

DETAILED DESCRIPTION

Described herein is a generic persistence engine (GPE) method and apparatus that allows persistent data sources, including software components having persistent data in diverse formats and data model structures, to participate in the persistent data management scheme of a running system without placing the system in an inactive or unavailable state.

Although applications sending data to a large system can often export representations of internal data structures and attributes that are marginally more open than the processor's native format (for instance, a word processor changing exportation format using a "save as . . ." command), operation on the exported data structure usually requires the use of the application that generated it.

Using the GPE of the invention with a running system, persistent data sent to the running system in any known or unknown persistent data model structure can be received and stored as long as the running system is in possession of a sufficient description (metadata) of the data model used by the sender. This universal ability to process any type of persistent data during runtime is useful because it is not feasible to easily shut down many types of large systems. Once the persistent data is received and stored in a format compatible with the running system, the data can be retrieved and used either by the running system or by the originating application.

Figure 1:
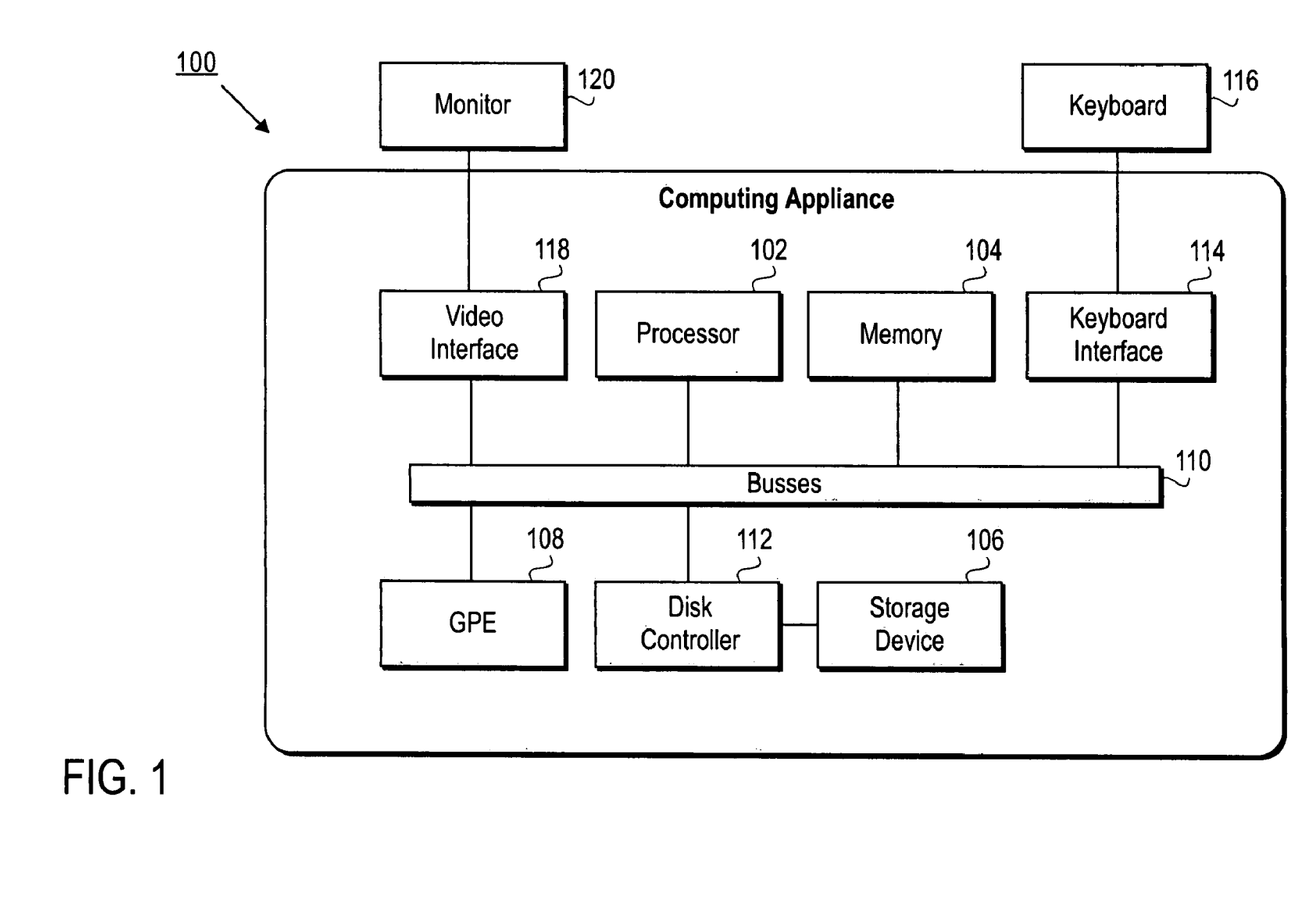
FIG. 1 is a block diagram of an example computing system incorporating a GPE embodiment of the invention.

FIG. 1 shows a computer system 100 suitable for practicing embodiments of the invention. In addition to including and/or having access to the GPE 108 of the invention, the computer system 100 may contain a processor 102, a memory 104, and a disk controller 112 coupled by one or more buses 110. The disk controller 112 may control a data storage device 106 or several data storage devices. The processor 102 accesses data, including computer programs that may be stored in the storage device 106. In addition, the processor 102 transfers computer programs into the memory 104 and executes the programs once resident in the memory. A video interface 118 may couple a monitor 120 to the system, and a keyboard interface 114 may couple a keyboard 116 to the system. A person having ordinary skill in the art will appreciate that a computer suitable for practicing the invention may contain additional or different components.

Figure 2:
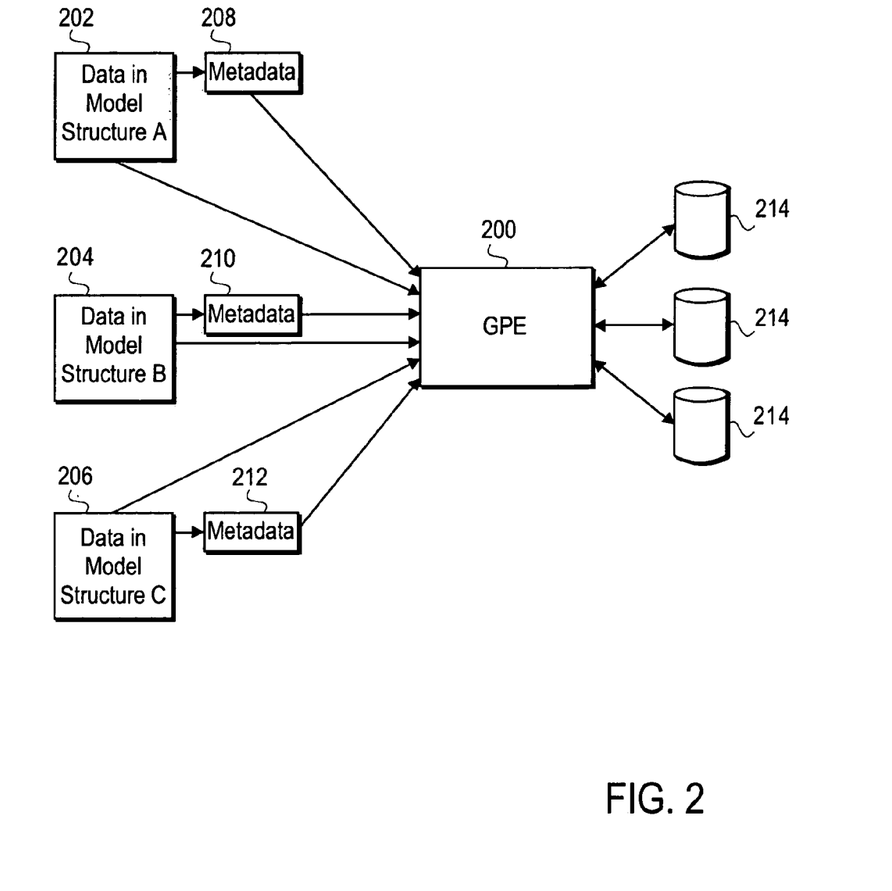
FIG. 2 is a block diagram of a first example GPE embodiment of the invention.

FIG. 2 shows in a general manner a first example GPE 200 of the invention that receives persistent data on behalf of a running system regardless of the data elements and data models 202, 204, 206 used to structure the persistent data and regardless of the processor type, operating system type, programming language type, and architecture type of the source sending the persistent data. Sources that send data elements needing persistence may include software components using new data models unknown to the running system as well as components using known data models. Seamless integration into the running system of persistent data having a known or unknown data model structure is achieved by the use of metadata 208, 210, 212 which contains a description of the data elements and/or the data model structure of the persistent data being received. The GPE 200 uses the metadata 208, 210, 212 to create and/or find a persistent data store compatible with the running system for each type of persistent data being received. The GPE 200 stores the persistent data on storage media 214 corresponding to the storage format and storage location established using the metadata 208, 210, 212.

The GPE 200 of the invention has the advantage of seamlessly integrating new persistent data models into the storage scheme of a running system without compromising the availability of the running system. Additionally, the GPE 200 provides a transparent storage layer that relieves persistent data sources, such as software components, of the responsibility of providing storage locations and formats for the data. This transparency allows data format and location to be changed during runtime of the system to improve performance and efficiency without affecting the manner in which the source sending the data, for instance a software component, uses the data.

The GPE 200 is neutral to processors, operating systems, programming languages, and platforms. The GPE 200 representation, for example, may be normalized for all processors and operating systems. The GPE 100 may also be made "streamable" so that it can be accessed through a stream of data on a network for networked applications, software components, and distributed system designs.

Figure 3:
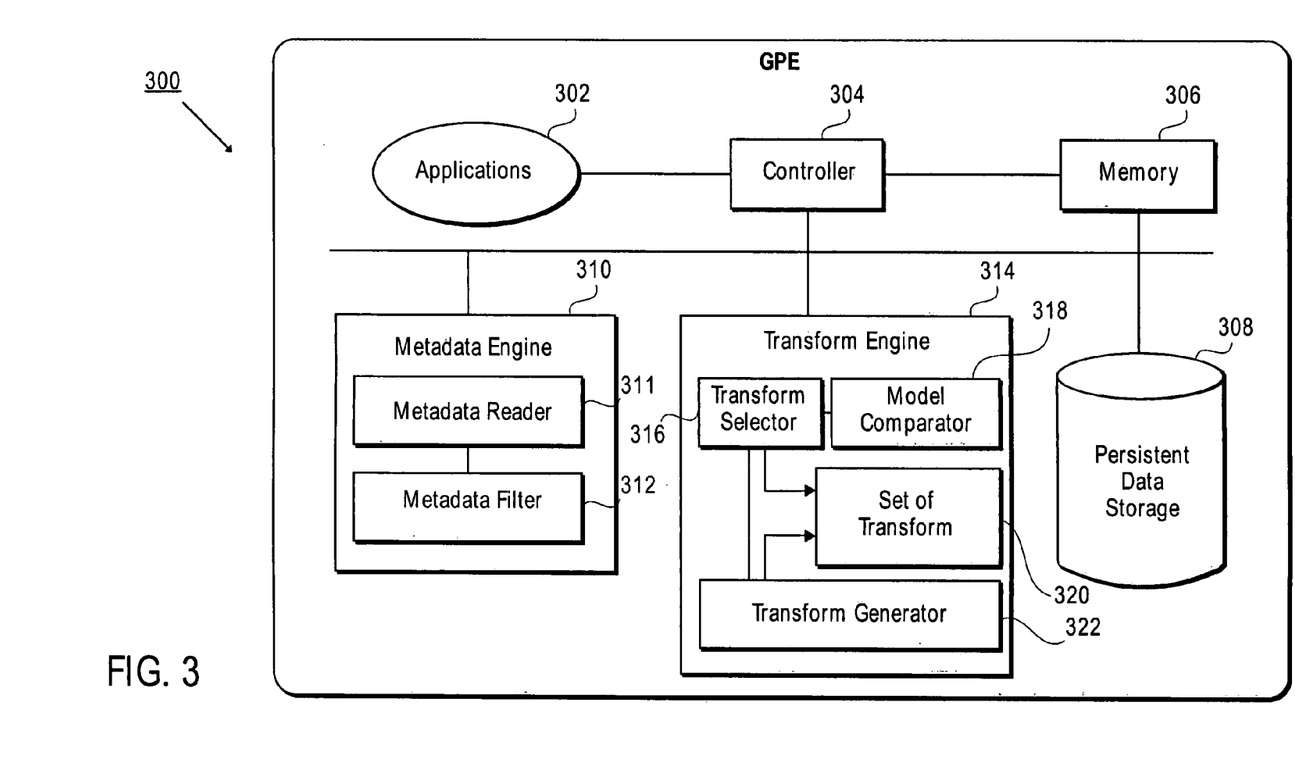
FIG. 3 is a block diagram of a second example GPE embodiment of the invention.

FIG. 3 shows a second example embodiment of a GPE of the invention 300. The GPE 300 includes a controller 304, which may contain or receive instructions from applications 302. In one embodiment the controller 304 is coupled to a metadata engine 310 and a transform engine 314 as well as to memory 306 and a persistent data storage device 308. The metadata engine 310 includes a metadata reader 311 and a metadata filter 312. The metadata reader 311 receives metadata and reads the model data structure of persistent data being received by the running system. The metadata filter 312 may select parts of the metadata relevant to selecting a pre-existing data transformation template ("transform"), or relevant to creating a new transform for the persistent data being received.

The transform engine 314 uses the filtered metadata to select and/or create a transform. Transforms establish a storage format and/or storage location for the persistent data. A transform selector 316 may use a data model comparator 318 to select a transform from a set of preexisting transforms 320 or may request the creation of a new transform from the transform generator 322. The transform generator 322 produces a new transform for the persistent data based on the filtered metadata. The new transform may be added to the set of transforms 320 for future use.

Figure 4:
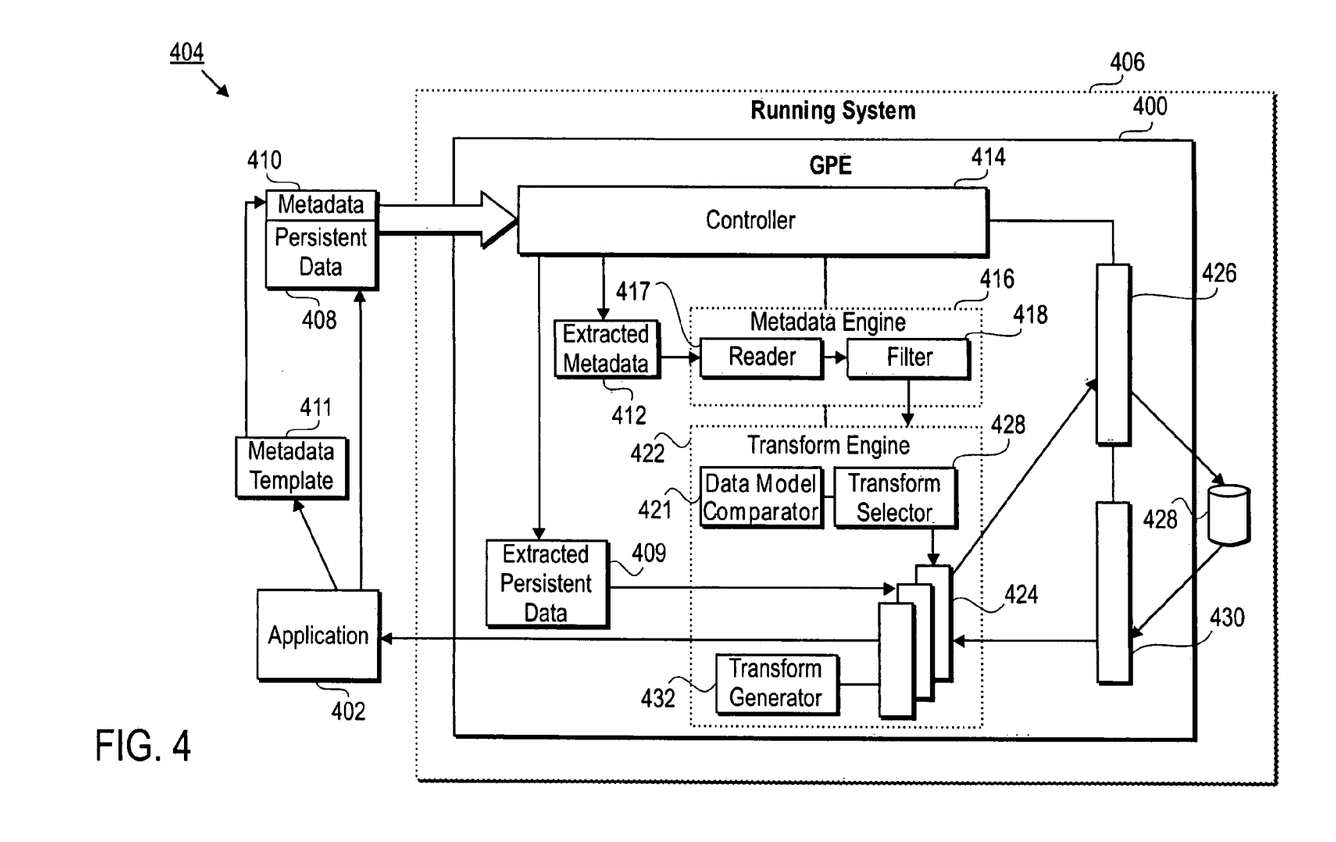
FIG. 4 is a block diagram of a third example GPE of the invention.

FIG. 4 shows a third example embodiment of the GPE 400 of the invention. A persistent data source, such as a software application 402, sends a persistence package 404 to a running system 406. The persistence package 404 comprises data elements needing persistence ("persistent data") 408, and metadata 410, describing the data model structure of the persistent data 408. The metadata 410 must be in a form compatible with and/or readable by the GPE 400. A metadata template 411 inherent in or adopted by the application 402 may be used to accomplish compatibility between the metadata 410 and the running system 406. The metadata template 411 may include or comprise rules for constructing the metadata 410 portion of a persistence package 404. In the illustrated embodiment, the persistence package 404 may be received by the running system 406 and passed to the GPE 400, or the GPE 400 may receive the persistence package 404 directly without the persistence package passing through the running system 406.

A controller 414 included in the GPE 400 separates the persistence package 404 into extracted metadata 412 and extracted persistent data 409, and may coordinate components of the GPE 400. The metadata engine 416 of the GPE 400 reads the extracted metadata 412 and may have a dedicated metadata reader 417. A metadata filter 418 deciphers, interprets, translates, maps, and/or parses the data structure model described by the extracted metadata 412.

Filtered metadata is passed to the transform engine 422. A transform selector 420 selects a transform 424 appropriate for the persistent data, or requests a new transform from the transform generator 432. A data model comparator 421 may assist the transform selector 420 in selecting and/or requesting a transform. The extracted and filtered metadata may thus be used to select an available transform 424 or create a new transform based on the data model structure of the extracted persistent data 409.

Transforms 424 are defined by the GPE 400 to transform particular extracted persistent data 409 into and out of specific storage formats and locations for the running system 406. The use of a persistence package 404 is optional, and in some variations the metadata 410 may be sent to the running system separately from the persistent data 408, for example, from a different source than the source sending the persistent data 408. In some embodiments, the GPE 400 may use a storing interface 426 and a retrieving interface 430 to send and receive extracted and/or transformed persistent data 409 to and from other parts of the running system 406 and/or the storage media 428.

Figure 5:
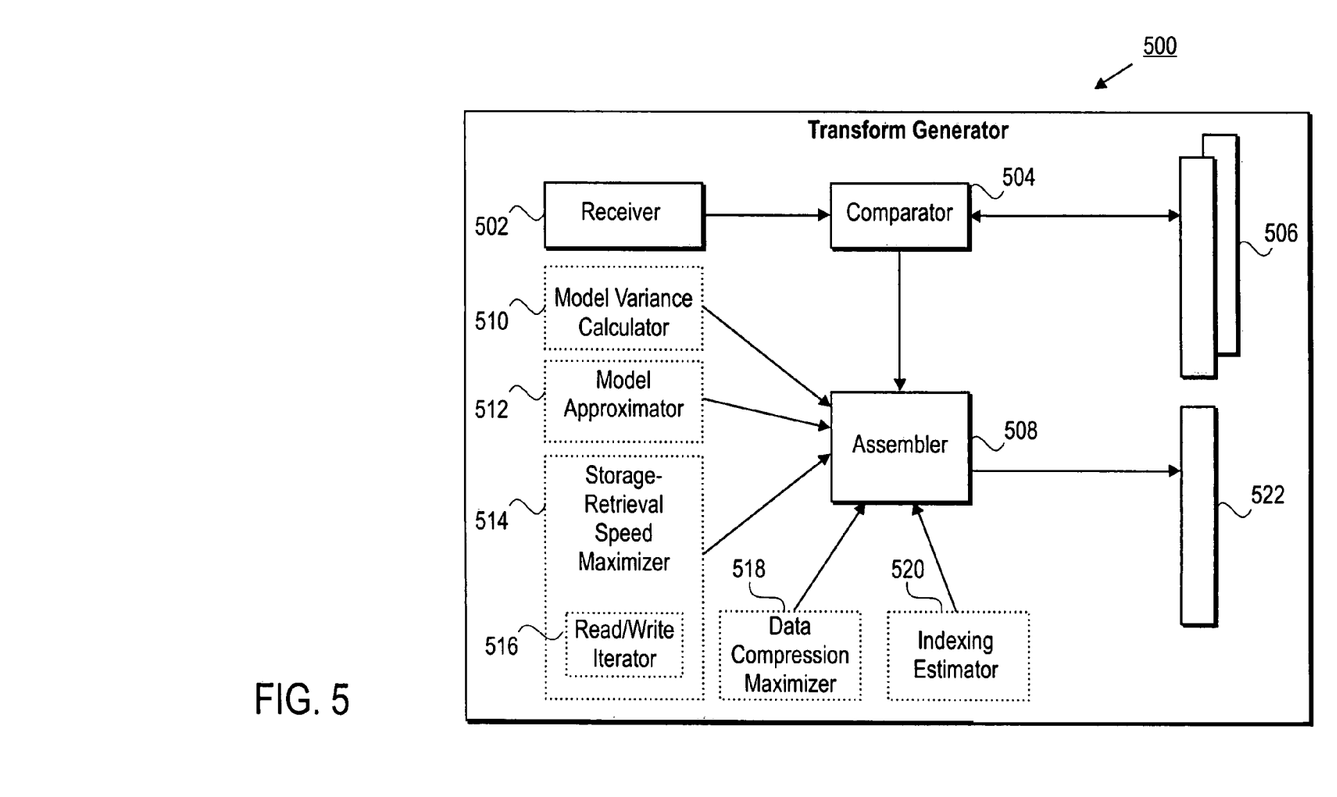
FIG. 5 is a block diagram of a transform generator of the invention.

FIG. 5 is a block diagram of a transform generator 500 of the invention. In most embodiments, a transform generator 500 will be coupled to a transform selector, both of which are subparts of a transform engine of the invention. A receiver 502 receives a description of a desirable model structure for the persistent data and/or may receive a summary of the original model structure of the persistent data. The receiver 502 passes the description and/or summary to a comparator 504, which may compare the model structure of the persistent data being received with model structures represented by preexisting transforms in a set of transforms 506. If a transform from the set of preexisting transforms 506 is suitable for formatting and/or storing the persistent data, then the selected transform is used to transform the persistent data. If no preexisting transform 506 is usable for the persistent data, then instructions may be sent to the assembler 508 to create a new transform 522 that is not in the set of preexisting transforms 506.

The assembler 508 may receive input from components that can be included in a transform generator 500 to produce a new transform 522 according to desired criteria. Depending on the application sending the persistent data and the model structure of the persistent data itself, the desired criteria may include, but are not limited to, matching the original model structure of the persistent data, approximating a preexisting transform, maximizing data storage/retrieval speed, maximizing data compression, and facilitating indexing of the stored persistent data. Other criteria and related routines for modeling the structure of the data according to these and additional criteria are not excluded by the invention.

The comparator 504 discussed above is a component of the transform generator 500 that may serve an additional purpose of providing the assembler with information about the similarities and differences between the model structure of the persistent data being received and the known model structures in the set of templates 506. Persistent data may be storable "as is." If the persistent data cannot be stored "as is" and requires transformation, a model variance calculator 510 may determine if a preexisting transform 506 is within tolerances for transforming the persistent data if minor alterations are made to the preexisting transform. If the persistent data is within tolerances of a "closest fit" transform, the transform may be altered into a new transform 522 and used to transform the persistent data. Sometimes the speed of data storage and retrieval for large and/or complex collections of persistent data is a primary issue. A storage/retrieval speed maximizer 514 may assist the assembler 508 to build a new transform 522 to maximize storage and retrieval of the persistent data. A read/write iterator 516 may be included in the speed maximizer 514 to build a new transform 522 imparting the fastest storage and retrieval time to persistent data. The iterator 516 may write small samples of persistent data to storage using one or more hypothetical transforms, and/or retrieve samples, and measure the speed results. Using real-time iterative trial-and-error adjustments to the one or more hypothetical transforms, the iterator 516 may determine a new transform 522 that provides optimal storage and/or retrieval speed for the persistent data. A data compression maximizer 518 may pass input to the assembler 508 to build a new transform 522 that provides optimized data compression for a particular type of persistent data. An indexing estimator 520 may pass input to the assembler 508 to build a new transform 522 that provides a storage format allowing easy indexing of the persistent data. A person having ordinary skill in the art will appreciate that many other components and routines are possible for assisting the assembler 508 to build new transforms 522 and are contemplated by the invention.

Figure 6:
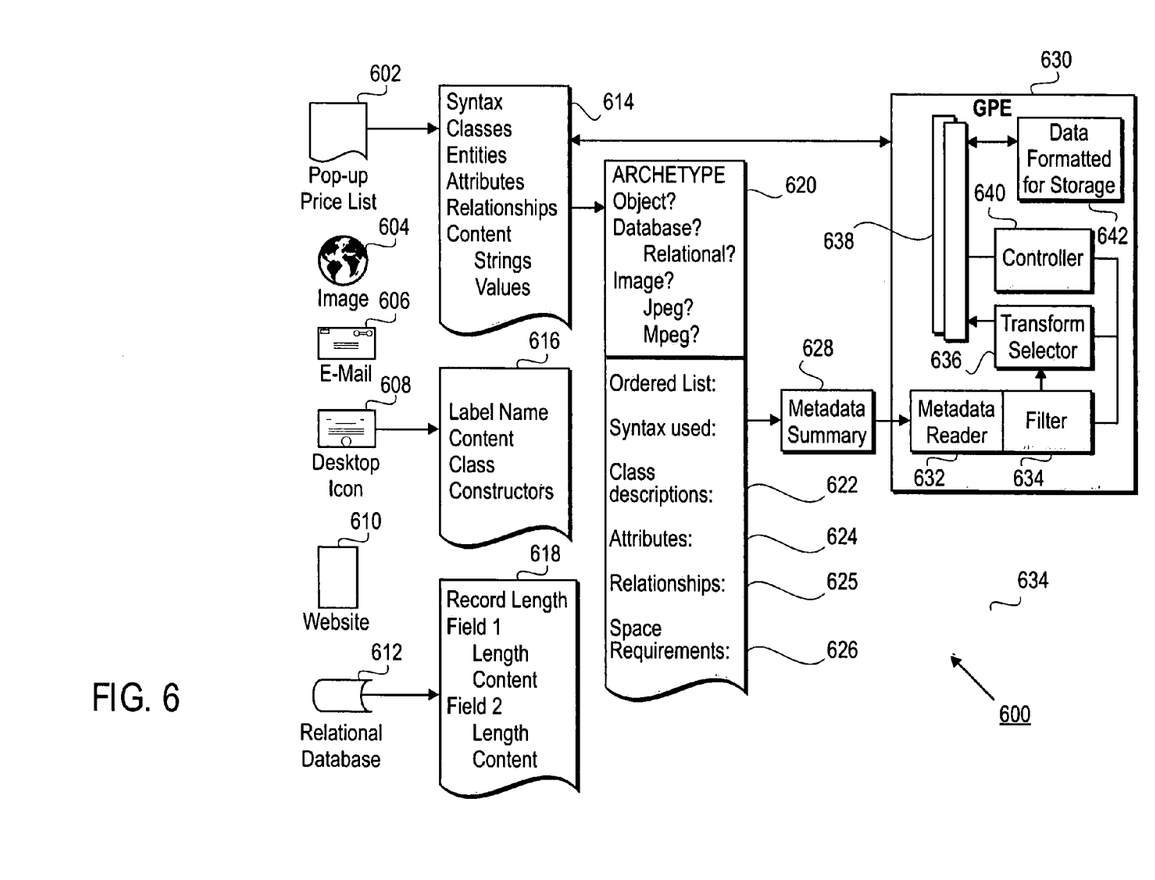
FIG. 6 is a graphical representation of an example persistent data transformation using the invention.

FIG. 6 shows an example persistent data transformation 600 using one embodiment of the invention. Various data sources, such as applications, use or export data that may require persistence. The data may represent various objects, databases, or procedures, such as a pop-up price list 602, an image 604, an e-mail 606, a desktop icon 608, a website 610, and a relational database 612. The persistent data used or exported by each application may have a data model structure that varies within a spectrum ranging from universally standard to proprietary. A desktop icon 608, for example, may have a fairly standard data model structure including such items as name, classes, constructors, and content 616. A customized pop-up price list 602, on the other hand, may have a more proprietary data model structure 614 containing, in any order, procedures, names, classes, entities, relationships, attributes, space requirements, syntax used, sting content, and value content. Although one data model structure used for the pop-up price list 602 may be proprietary, another data model structure yielding an identical pop-up price list 602 may be easily executable using a data model structure akin to the desktop icon 608. In other words, it is possible for an application either to follow or to disregard known data model structures to achieve the same result. There is great variety in the types of data that may need persistence: a relational database 612 has a characteristic data model structure 618 that may include fixed length records and/or fixed length fields and index files—a very different data model from the data model that represents a Java object.

A metadata template 620 of the invention may be used by each application to describe the data model structure used or exported by the application. In one embodiment, the metadata template 620 may include categories of data model structure archetypes, including but not limited to objects, procedures, relational databases, and images so that an application can designate a general category describing its data model structure. Parts of the metadata template 620 may be a simple checklist that describes an application's data model structure. Other parts of the metadata template 620 may give rules or an order for describing data model structure. For example, the metadata template 620 might require that class descriptions 622 be described in a certain order before other attributes 624, relationships 625, and space requirements 626. The completed metadata template 620 describes the data model structure of a group of persistent data, for example the pop-up price list 602, to be sent from an application to a running system. The illustrated metadata template 620 is an example embodiment for purposes of explaining the invention. Other embodiments of the metadata template 620 may be substantially longer, and may include directed label graphs and many other methods of describing a data model structure.

The information arranged by the metadata template 620 may be summarized into a metadata summary 628 using shorthand symbols, a bitmask, a hash, or any other manner of efficiently coding the metadata 628. The metadata 628 may be encapsulated along with the persistent data into a persistence package 630. In another variation, the metadata 628 may be sent separately from the persistent data.

In a running system, the GPE 630 of the invention may include controller 640 that coordinates the components, including a metadata reader 632 or other means for using the metadata 628 to map and/or interpret the data model structure of the incoming persistent data (e.g., 602-612). A metadata filter 634 may select features of the metadata 628 relevant to selecting a transform 638. A transform selector 636 may use the filtered metadata to select a transform 638 or request the creation of a transform 638, if necessary, for storing and retrieving the persistent data 602-612. A particular storage format 642 and location for the persistent data may depend on the type of persistent data received and the transform 638 selected or created. An example storage format for the persistent data might include such descriptors as the name of an object, location coordinates, total space requirements, transform used, and degree of data compression used for storage. Once the persistent data is ordered in a format compatible with the running system and the storage media, the data may be retrieved for use by the running system and/or an application that originally sent the persistent data.

Figure 7:
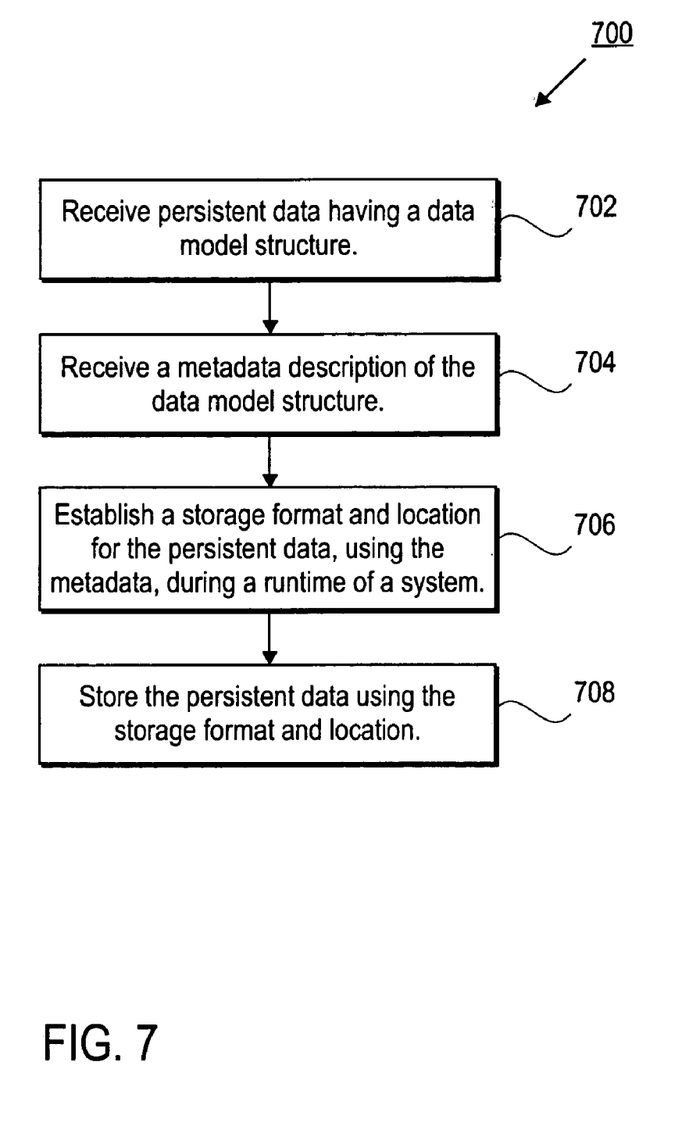
FIG. 7 is a flowchart of an example method of the invention.

FIG. 7 shows an example method embodiment 700 of the invention. The method may be performed using a continuously running system having data storage or access to data storage. Running the system without interruption may be desired because it is inconvenient or not feasible to shut down the system. The invention can receive, store, retrieve, and use persistent data having a model structure foreign to the running system while the system is continuously operating. This avoids the need to shut down the system to retool the persistent storage mechanism for compatibility with persistent data having a foreign data model structure.

Persistent data having a model structure is received into the system 702. Metadata comprising at least in part a description of the model structure of the received persistent data is also received 704. The metadata is used to establish, during runtime of the system, a storage format or a storage location, or both, for the persistent data 706. Thus, the invention receives persistent data from diverse sources that may use a variety of known and unknown persistent data model structures. The invention stores the persistent data in a format and location compatible with the system, while the system is running 708.

Figure 8:
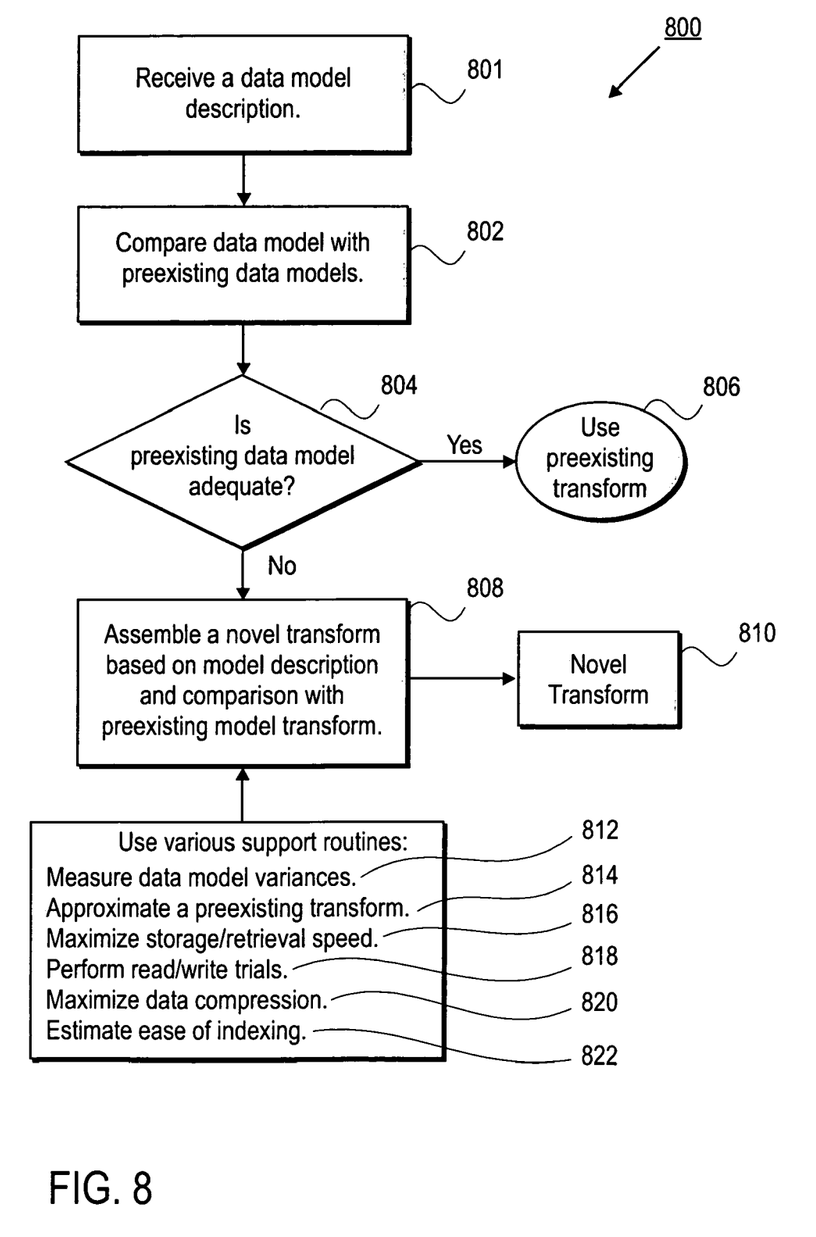
FIG. 8 is a flowchart of an example method of the invention for creating a transform.

FIG. 8 shows an example method for generating a transform of the invention 800. A data model description is received 801. Using the description, the data model of persistent data being received by a running system is compared with preexisting data models 802. A decision is made to use a preexisting transform 806 or assemble a new transform 810. If there is no adequate preexisting transform, then a new transform 810 may be assembled using the model description and/or the comparison with a preexisting transform 808. Assembling a new transform may be supported using optional routines, including the following routines. Variances between the data model of the persistent data and a preexisting data model may be measured 812. A preexisting data model may be approximated by altering a preexisting transform 814 Efficient data storage and retrieval speed may be maximized 816. The data storage and retrieval speed may be maximized by iteratively performing data read/write trials and selecting the fastest trial 818. Data compression may be maximized 820. Efficient indexing for the persistent data may be estimated 822. Other optional routines may be added to support the assembling of a new transform.

Figure 9:
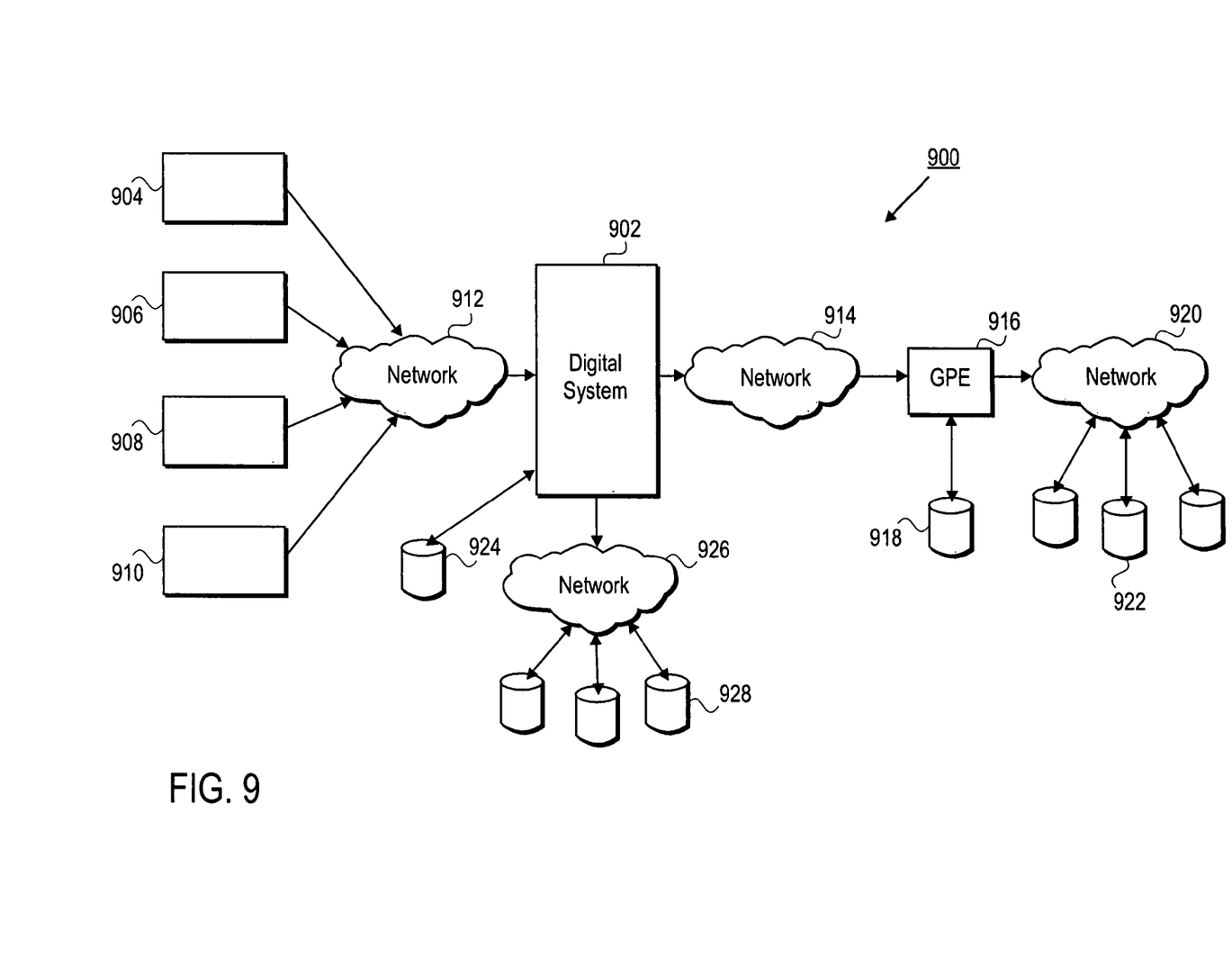
FIG. 9 is a block diagram of a first example network incorporating a GPE embodiment of the invention.

FIG. 9 shows a first example network system 900 suitable for practicing embodiments of the invention. A system 902 receives persistent data from sources, such as software components 904, 906, 908, 910, over a network 912. The system sends the persistent data over a network 914 to a GPE 916 of the invention. The GPE 916 processes the persistent data and stores the persistent data in attached storage media or sends the persistent data using a network 920 such as a storage area network to remote storage media 922. In one variation, the GPE 916 processes the persistent data and sends the persistent data back over the network 914 to the system 902. The system 902 then stores the persistent data in attached storage media 924 or using a network 926 such as a storage area network to remote storage media 928. A person having ordinary skill in the art will appreciate that a network system suitable for practicing the invention may contain additional or different components, or various different configurations.

Figure 10:
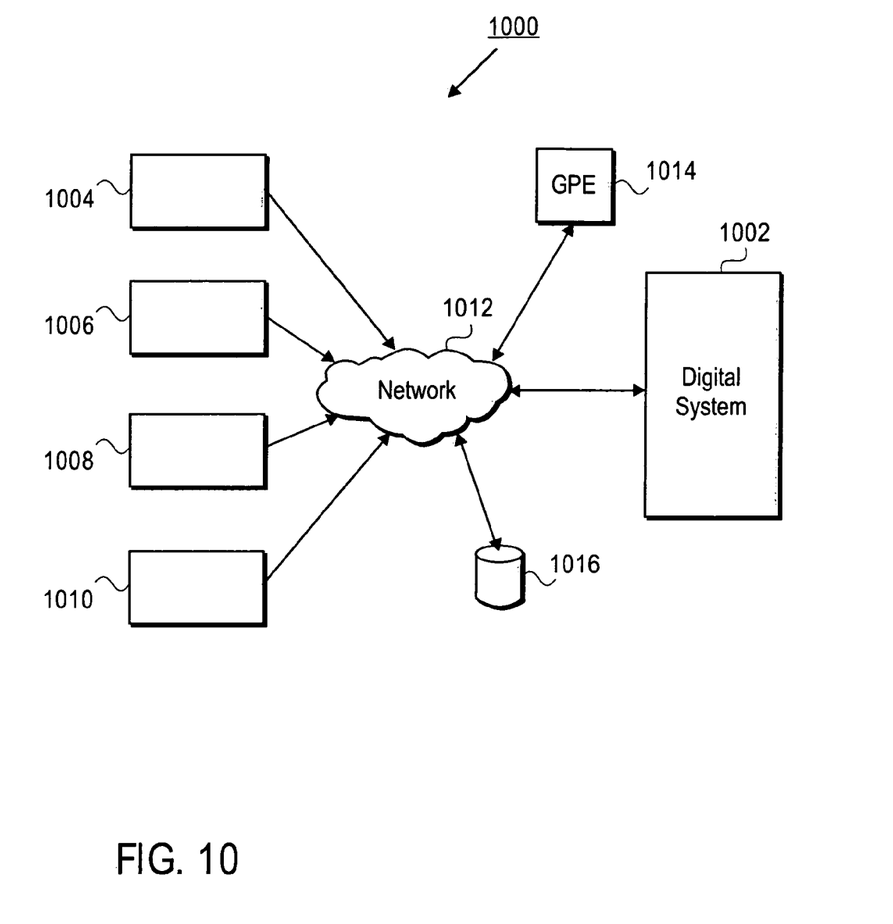
FIG. 10 is a block diagram of a second example network incorporating a GPE embodiment of the invention.

FIG. 10 shows a second example network system 1000 configured in a hub arrangement suitable for practicing embodiments of the invention. A digital system 1002 receives persistent data from multiple sources, such as applications 1004, 1006, 1008, 1010, over a network 1012. The digital system 1002 sends the persistent data over the network 1012 to a GPE 1014 of the invention. The GPE 1014 processes the persistent data and sends the data over the network 1012 to storage media 1016. A person having ordinary skill in the art will appreciate that a network system suitable for practicing the invention may contain additional or different components, or various configurations.

Figure 11:
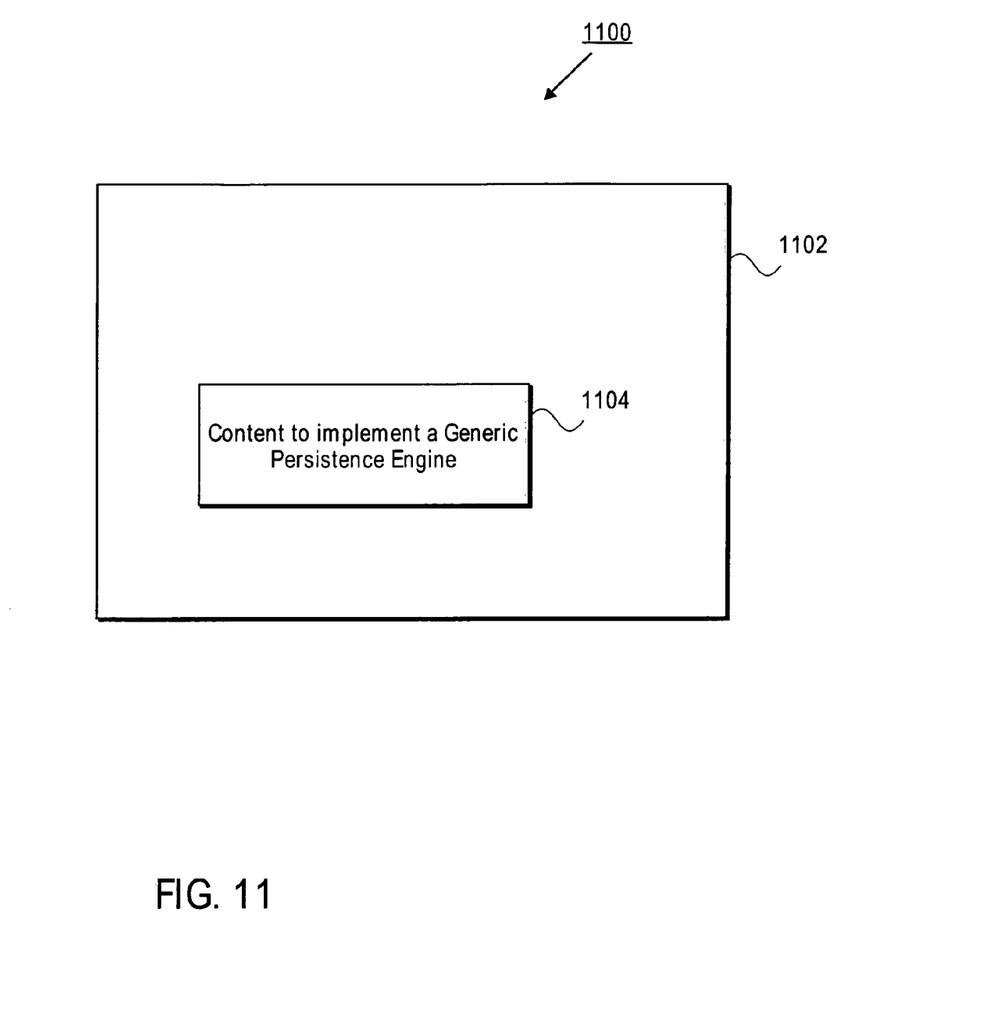
FIG. 11 is graphical representation of an article of manufacture comprising a machine-readable medium having instructions, that when executed cause a machine to practice a method of the invention or become an apparatus of the invention.

FIG. 11 shows an article of manufacture 1100, comprising a machine-readable medium 1102 having instructions 1104, that when executed cause a running system having data storage and/or access to data storage to receive persistent data having a model structure. Metadata comprising at least in part a description of the model structure of the persistent data is also received. The metadata is used to establish, during runtime of the system, a storage format or a storage location, or both, for the persistent data. The persistent data is stored, during runtime of the system, using the storage format and/or the storage location established by the invention.

The GPE method and apparatus of the invention may be provided partially or entirely as a computer program product that may include the machine-readable medium. The machine-readable medium may include, but is not limited to, floppy diskettes, optical disks, CD-ROMs, magneto-optical disks, ROMs, RAMs, EPROMs, EEPROMs, magnetic or optical cards, flash memory, or other type of media suitable for storing electronic instructions. Moreover, the invention may also be downloaded as a computer program product, wherein the program may be transferred from a remote computer to a requesting computer by way of data signals embodied in a carrier wave or other propagation media via a communication link (e.g., a modem or network connection).

The GPE method and apparatus of the invention may be performed by any combination of hardware and software components, including subcomponents, routines, and subroutines. Thus, in one variation, hardware and/or software may be installed in network nodes to perform the method.

Importantly, while the GPE method and apparatus have been described in the context of a computer and network systems, they can be applied in a wide variety of different systems in which persistent data are exchanged. Such systems include voice, video, music, broadcast and other types of data systems.

The methods and apparatus are described above in their most basic forms but modifications could be made without departing from the basic scope of the invention. It will be apparent to persons having ordinary skill in the art that many further modifications and adaptations can be made. The particular embodiments are not provided to limit the invention but to illustrate it. The scope of the invention is not to be determined by the specific examples provided above but only by the claims below.

What is claimed is:

1. A method, comprising:
receiving a persistence package at a running system from one of a plurality of different software components, the persistence package including persistent data and metadata, the software components having persistent data in different formats that are foreign to the running system;
extracting persistent data and metadata from the persistence package, the persistent data relating to diverse types of objects constructed at runtime of the software component and needed during more than one invocation of the software component, the metadata describing the persistent data, and comprising, at least in part, a description of the format of the persistent data;
establishing, based on the extracted metadata, a transform for a storage format and a storage location for the persistent data;
applying the transform to the persistent data to format the persistent data without using the software component from which the persistence package was received from the format of the software component into a storage format that is compatible with the receiving system and with a storage device of the running system independent of the software component; and
storing the persistent data in the storage device in the storage format.

2. The method of claim 1, further comprising using metadata passed from the persistence package to establish a storage location for the persistent data during the runtime of the system.

3. The method of claim 1, wherein the metadata comprises at least in part a description of a model structure of the persistent data.

4. The method of claim 3, wherein the metadata conforms to a metadata template comprising rules for describing the model structure.

5. The method of claim 4, wherein extracting the persistent data and the metadata from the persistence package comprises using a filter.

6. The method of claim 1, further comprising retrieving persistent data from storage using a transform during the runtime of the receiving system.

7. The method of claim 1, further comprising receiving persistent data compatible with at least one of any type of processor, any type of programming language, any type of operating system, and any type of architecture.

8. An apparatus, comprising:
a data storage device;
a running receiving system coupled to the data storage device, the receiving system including a persistence engine to receive a persistence package from one of a plurality of different software components that are foreign to the running system, the persistence package including persistent data and metadata, the metadata comprising, at least in part, a description of the format of the persistent data, the software components having persistent data in different formats, wherein the persistence engine extracts persistent data and metadata from the persistence package, wherein the persistence engine uses the extracted metadata passed from the persistence package to establish, without using the software component from which the persistence package was received, a storage format and location to store the persistent data in the data storage device, and wherein the persistence engine applies the storage format to the persistent data to format the persistent data from the format of the software component into a storage format that is compatible with the receiving system and with the storage device independent of the software component, and to store the formatted system data in the data storage device.

9. The apparatus of claim 8, wherein the data storage device is external to a receiving system using the persistence engine.

10. The apparatus of claim 8, further comprising a storing interface to store the persistent data using the storage format.

11. The apparatus of claim 8, further comprising a retrieving interface to retrieve stored persistent data for use by one of the receiving system and the software component, the software component comprising an application.

12. The apparatus of claim 8, wherein the metadata comprises at least in part a description of a data model structure of the persistent data.

13. The apparatus of claim 12, further comprising a metadata template to format the metadata for readable reception by the persistence engine.

14. The apparatus of claim 8, wherein the persistence engine receives a persistence package comprising the metadata and the persistent data.

15. The apparatus of claim 8, wherein the persistence engine receives persistent data structured using any data model from a source comprising at least one of any type of processor, any type of operating system, any type of programming language, and any type of architecture.

16. The apparatus of claim 8, further comprising a metadata engine having a metadata reader and a metadata filter.

17. The apparatus of claim 16, wherein the metadata filter interprets the metadata.

18. The apparatus of claim 8, further comprising a transform engine having a set of transforms, a transform selector, and a transform generator.

19. The apparatus of claim 18, wherein a transform establishes at least one of the storage format and the storage location to store the persistent data in the data storage device.

20. The apparatus of claim 18, the transform selector further comprising a data model comparator.

21. The apparatus of claim 18, wherein the transform selector selects a transform based on filtered metadata.

22. The apparatus of claim 18, wherein the transform selector requests a transform from the transform generator based on filtered metadata.

23. The apparatus of claim 22, wherein the transform generator produces a transform that remodels the persistent data to approximate as closely as possible a preexisting transform from the set of transforms.

24. The apparatus of claim 22, wherein the transform generator produces a transform that substantially maintains a model structure of the persistent data received by the receiving system.

25. The apparatus of claim 22, wherein the transform generator produces a transform to remodel the persistent data to maximize efficient retrieval for an application.

26. The apparatus of claim 22, wherein the transform generator uses iterative read-write trials to produce a transform to remodel the persistent data to maximize storage and/or retrieval speed.

27. The apparatus of claim 22, wherein the transform generator produces a transform to remodel the persistent data to maximize data compression.

28. An apparatus, comprising:
a communications interface;
a data model description receiver to receive a data model description from one of a plurality of different software components that are foreign to the apparatus, the software components having persistent data in accordance with different data models, the data model descriptions describing, at least in part a format of data associated with the models;
a set of transforms;
a data model comparator to produce a comparison independent of the software component from which the data model description is received between the data model description and a data model in a transform in the set of transforms;
a transform generator having an assembler to produce a transform based on the data model description and the comparison independent of the software component from which the data model description was received, the transform establishing a storage format and a storage location for data associated with the model;
a storage device;
a transform engine to apply a transform to format persistent data for storage from the format of the software component into a storage format that is compatible with the storage device independent of the software component; and
a storing interface to store the formatted persistent data in the storage device.

29. The apparatus of claim 28, wherein the transform generator further comprises a data model variance calculator coupled to the assembler.

30. The apparatus of claim 28, wherein the transform generator further comprises a data model approximator coupled to the assembler.

31. The apparatus of claim 28, wherein the transform generator further comprises an efficient storage/retrieval speed maximizer coupled to the assembler.

32. The apparatus of claim 31, wherein the storage/retrieval speed maximizer further comprises a read/write iterator.

33. The apparatus of claim 28, wherein the transform generator further comprises a data compression maximizer coupled to the assembler.

34. The apparatus of claim 28, wherein the transform generator further comprises an indexing estimator coupled to the assembler.

35. A method, comprising:
receiving a data model description at a running system from one of a plurality of different software components that are foreign to the running system, the software components having persistent data in accordance with different data models, the persistent data relating to diverse types of objects, the data model description describing the persistent data, and comprising, at least in part, a description of the format of the persistent data;
comparing the data model description to a preexisting data model independent of the software component from which the data model description is received;
assembling a transform at the running system independent of the software component from which the data model description is received based on the data model description and the comparison to establish a storage format for persistent data during runtime of a system;
applying a transform to format persistent data for storage from the format of the software component into a storage format that is compatible with a storage device independent of the software component; and
storing the formatted persistent data at the storage device.

36. The method of claim 35, wherein the assembling a transform includes measuring a variance between the data model description and a preexisting data model.

37. The method of claim 35, wherein the assembling a transform includes approximating a preexisting data model.

38. The method of claim 35, wherein the assembling a transform includes maximizing data storage speed and/or data retrieval speed.

39. The method of claim 38, wherein the maximizing speed includes iteratively performing data read/write trials and selecting the fastest trial.

40. The method of claim 35, wherein the assembling a transform includes maximizing data compression.

41. The method of claim 35, wherein the assembling a transform includes optimizing efficient indexing for the persistent data.

42. An article of manufacture, comprising:
a machine-readable medium comprising instructions, that when executed cause a machine to:
receive a persistence package including persistent data having a model structure from one of a plurality of different software components that are foreign to the machine and the machine-readable medium, the software components having persistent data in different model structures, the persistent data relating to diverse types of objects;
receive metadata comprising at least in part a description of the model structure, the metadata describing the persistent data and comprising, at least in part, a description of the format of the persistent data; and
establish, using the metadata and without using the software component from which the persistence package was received, a storage format and a storage location for the persistent data; and
apply the established storage format to the persistent data to format the persistent data for storage from the format of the software component into a storage format that is compatible with the machine and with a storage device independent of the software component.

43. The article of manufacture of claim 42, further comprising instructions, that when executed, cause a machine to store the persistent data using the storage format.

44. The article of manufacture of claim 42, further comprising instructions, that when executed, cause a machine to receive metadata conforming to a metadata template comprising rules for describing a data model structure of the persistent data.

45. The article of manufacture of claim 44, further comprising instructions, that when executed, cause a machine to extract the persistent data and the metadata from the persistence package.

46. The article of manufacture of claim 42, further comprising instructions, that when executed, cause a machine to retrieve the persistent data using the storage format.

47. The article of manufacture of claim 42, further comprising instructions, that when executed, cause a machine to select and/or create, based on the metadata, a transform to establish at least one of the storage format and the storage location.

48. The article of manufacture of claim 42, further comprising instructions, that when executed, cause a machine to receive persistent data compatible with one of any type of processor, any type of programming language, any type of operating system, and any type of architecture.

* * * * *